US011807699B2

(12) United States Patent
Carloff

(10) Patent No.: US 11,807,699 B2
(45) Date of Patent: Nov. 7, 2023

(54) ACRYLIC COMPOSITION HAVING AN INCREASED RESISTANCE TO ALCOHOLS, OILS AND FATS

(71) Applicant: Röhm GmbH, Darmstadt (DE)

(72) Inventor: Rüdiger Carloff, Darmstadt (DE)

(73) Assignee: Röhm GmbH, Darmstadt (DE)

( * ) Notice: Subject to any disclaimer, the term of this patent is extended or adjusted under 35 U.S.C. 154(b) by 300 days.

(21) Appl. No.: 17/309,706

(22) PCT Filed: Dec. 11, 2019

(86) PCT No.: PCT/EP2019/084562
§ 371 (c)(1),
(2) Date: Jun. 16, 2021

(87) PCT Pub. No.: WO2020/126722
PCT Pub. Date: Jun. 25, 2020

(65) Prior Publication Data
US 2022/0033551 A1 Feb. 3, 2022

(30) Foreign Application Priority Data

Dec. 19, 2018 (EP) .................................. 18213814

(51) Int. Cl.
| C08F 212/10 | (2006.01) |
| B29C 45/00  | (2006.01) |
| C08F 220/06 | (2006.01) |
| C08F 222/06 | (2006.01) |
| C08F 279/06 | (2006.01) |
| C08L 25/12  | (2006.01) |
| C08L 33/10  | (2006.01) |
| B29K 9/06   | (2006.01) |
| B29K 25/00  | (2006.01) |
| B29K 33/00  | (2006.01) |
| B29K 33/20  | (2006.01) |
| C08L 51/00  | (2006.01) |

(52) U.S. Cl.
CPC ........ *C08F 212/10* (2013.01); *B29C 45/0001* (2013.01); *C08F 220/06* (2013.01); *C08F 222/06* (2013.01); *C08F 279/06* (2013.01); *C08L 25/12* (2013.01); *C08L 33/10* (2013.01); *B29K 2009/06* (2013.01); *B29K 2025/08* (2013.01); *B29K 2033/12* (2013.01); *B29K 2033/20* (2013.01); *C08L 51/003* (2013.01); *C08L 2207/53* (2013.01)

(58) Field of Classification Search
CPC ..... C08F 222/06; C08L 2207/53; C08L 25/12
See application file for complete search history.

(56) References Cited

U.S. PATENT DOCUMENTS

| 3,336,267 A | 8/1967 | Zimmerman et al. |
| 4,085,166 A | 4/1978 | DiLeone et al. |
| 4,513,118 A | 4/1985 | Suetterlin et al. |
| 4,833,221 A | 5/1989 | Albrecht |
| 5,270,397 A | 12/1993 | Rhein et al. |
| 5,489,633 A | 2/1996 | Deckers et al. |
| 5,650,107 A | 7/1997 | Vetter et al. |
| 6,087,449 A | 7/2000 | Tiefensee et al. |
| 6,689,827 B1 | 2/2004 | Schade et al. |
| 9,656,408 B2 | 5/2017 | Fischer et al. |
| 2009/0221386 A1 | 9/2009 | Ladd et al. |
| 2010/0174022 A1 | 7/2010 | Schultes et al. |
| 2012/0322932 A1 | 12/2012 | Schultes et al. |
| 2016/0243728 A1* | 8/2016 | Fischer .................. C08L 33/20 |

FOREIGN PATENT DOCUMENTS

| DE | 1 231 013 | 12/1966 |
| DE | 44 40 219 | 5/1996 |
| EP | 0 113 924 | 7/1984 |
| EP | 0 264 590 | 4/1988 |
| EP | 0 465 049 | 1/1992 |
| EP | 0 522 351 | 1/1993 |
| EP | 0 683 028 | 11/1995 |
| EP | 2 465 884 | 6/2012 |
| GB | 2 294 936 | 5/1996 |
| JP | 2-272050 | 11/1990 |
| WO | 01/46317 | 6/2001 |
| WO | 2008/148595 | 12/2008 |

OTHER PUBLICATIONS

International Search Report dated Feb. 17, 2020 in PCT/EP2019/084562, 6 pages.
Written Opinion dated Feb. 17, 2020 in PCT/EP2019/084562, 10 pages.
"*Acrylite® hw55 Acrylic Polymer Meets Stringent Requirements*", Acrylite Polymers, 2010, 2 pages.
"*PLEXIGLAS® Heatresist hw55 clear*", Evonik Industries AG, 2013, 3 pages.
"*Evonik Cyro Introduces Acrylite® hw55 Acrylic Polymer For High Heat Applications Requiring Excellent Lighting Efficiency*", Acrylite Polymers, 2010, 2 pages.

* cited by examiner

*Primary Examiner* — Jeffrey C Mullis
(74) *Attorney, Agent, or Firm* — Grüneberg and Myers PLLC

(57) ABSTRACT

A transparent acrylic-based polymer composition has an increased resistance to alcohols, oils and fats. The polymer composition contains: (A) a copolymer of alkyl(meth)acrylates, aromatic vinyl monomer and unsaturated carboxylic acid anhydride; (B) a copolymer containing aromatic vinyl monomer and a vinyl cyanide monomer; and (C) a particulate core-shell type graft copolymer containing a butadiene-based core as a rubbery phase and a copolymer containing alkyl(meth)acrylates and, optionally, aromatic vinyl monomer as a hard phase. The components A and B form a polymer matrix and the particulate core-shell type graft copolymer C is dispersed in said polymer matrix.

20 Claims, 1 Drawing Sheet

ACRYLIC COMPOSITION HAVING AN INCREASED RESISTANCE TO ALCOHOLS, OILS AND FATS

CROSS-REFERENCE TO RELATED APPLICATIONS

This application is the National Stage entry under § 371 of International Application No. PCT/EP2019/084562, filed on Dec. 11, 2019, and which claims the benefit of priority to European Application No. 18213814.9, filed on Dec. 19, 2018.

BACKGROUND OF THE INVENTION

Field of the Invention

The present invention relates to a transparent acrylic-based polymer composition having an increased resistance to alcohols, oils and fats. In particular, the composition has an excellent resistance to water isopropanol mixtures which are commonly used for disinfection and sterilization of disposable medical devices. Additionally, the composition has a high transparency, even after a long term exposure to commercial disinfectants, low haze and excellent mechanical properties.

Accordingly, the composition of the present invention is highly suitable for the manufacturing of various medical devices such as intravenous and catheter accessories, blood handling devices, chest drainage units, or respiratory ventilating devices.

Description of Related Art

Medical grade acrylic-based polymer compositions offer an excellent balance of optical and mechanical properties, can be sterilised using e-beam or γ-radiation and are compatible with biological materials. In addition, such compositions often have an excellent thermoplastic processability and can be advantageously used for injection moulding. This allows their use in a variety of medical device applications as well as in medical diagnostic devices. Typical applications of such materials include inter alia intravenous and catheter accessories, blood handling devices, chest drainage units, respiratory ventilating devices etc.

Although commercially available impact-modified medical grade acrylic-based polymer compositions already have a good chemical resistance to materials such as alcohols, oils and fats, they tend to become turbid and get cracks upon a long-term exposure to mixtures of water with alcohols. Additionally, such long-term exposure is detrimental for mechanical properties of the composition. This behaviour becomes particularly problematic in the presence of isopropanol-water mixtures, which are now commonly used as disinfectants for medical devices.

WO 2008/148595 A1 describes a polymer blend comprising a copolymer of methyl methacrylate (MMA), styrene and maleic anhydride as well as a styrene-acrylonitrile copolymer (SAN). This polymer blend has good optical and mechanical properties and an increased stress cracking resistance in the presence of neat isopropanol. WO 2008/148595 A1 is silent in respect to stress cracking resistance in the presence of isopropanol-water mixtures which are commonly used as disinfectants.

U.S. Pat. No. 6,689,827 B1 describes a transparent, impact-modified thermoplastic moulding composition comprising:

A) a matrix which is formed from polymethylmethacrylate, or a copolymer of methyl methacrylate and a C1- to C8-alkyl acrylate, and a SAN copolymer,
B) as impact modifier a graft copolymer having a graft base or graft core with a glass transition temperature smaller than 0° C., being built from copolymers of butadiene and/or isoprene with styrene or with styrene having up to 12 carbon atoms, which have a mean particle size in the range of 30 to 250 nm, and having grafted thereon an inner graft shell, being built from vinylaromatic monomers and an alkyl methacrylate or acrylate, and an outer graft shell being built from one or more methacrylates of C1- to C8-alkanols,
C) an additive consisting essentially of c1) at least one 2,6-disubstituted phenol.

WO 01/46317 A1 teaches a transparent, impact-resistant thermoplastic moulding composition, comprising a mixture of A) 4 to 80% by weight of a methyl methacrylate polymer of 90 to 100% by weight of methyl methacrylate and 0 to 10% by weight of an acrylic acid ester of C1- to C8-alkanols,
B) 5 to 75% by weight of a copolymer of 78 to 88% by weight of a vinylaromatic monomer and 12 to 22% acrylonitrile by weight,
C) 10 to 91% by weight of a graft copolymer having a bimodal particle size distribution and containing an elastomeric graft core having a glass transition temperature of less than 0° C. and one or more graft envelopes containing (meth)acrylic acid esters of C1- to C8-alkanols and optionally vinylaromatic monomers of up to 12 C atoms and/or crosslinking monomers, and
D) from 0 to 20% by weight of additives, based on the sum of components A), B) and C), the percentages by weight of A), B) and C) adding up to 100 and the difference between the refractive index of component C) and that of the mixture of components A) and B) and, if desired, D) being less than 0.01.

JP H02-272050 A2 describes impact-resistant polymer blends comprising (A) a copolymer, containing 40-90 wt. % MMA, 5-20 wt. % maleic anhydride, 5-40 wt. % styrene and 1-15 wt. % $C_{1-4}$-alkyl acrylate;
(B) a vinyl cyanide/aromatic vinyl copolymer or methyl methacrylate/$C_{1-4}$-alkyl acrylate and;
(C) a copolymer prepared by grafting vinyl cyanide and an aromatic vinyl compound onto a rubber-like polymer.

The polymer blends of JP H02-272050 A2 have a high heat resistance, impact resistance and transparency and are primarily designed for use in automotive applications.

Accordingly, it has been a long-existing need for medical grade acrylic-based polymer compositions having an improved long-term resistance to isopropanol-water-based disinfectants, oils and fats.

SUMMARY OF THE INVENTION

The present invention is based on a surprising finding that a long-term resistance of some medical grade acrylic-based polymer compositions to isopropanol-water-based disinfectants, oils and fats as well as their stress crack resistance can be significantly increased by addition of a particulate core-shell type graft copolymer comprising a butadiene-based core as a rubbery phase and a copolymer comprising alkyl (meth)acrylates and, optionally, aromatic vinyl monomer as a hard phase. In this context, it showed to be particularly advantageous to keep the content of the vinyl cyanide monomer in the particulate core-shell type graft copolymer below than 5.0 wt.-%, based on the weight of the core-shell type graft copolymer.

Accordingly, one aspect of the present invention relates to a polymer composition comprising, based on the weight of the polymer composition, the following components A, B and C:

A. 40.0 to 84.0 wt.-%, preferably 54.0 to 78.0 wt.-% of a copolymer comprising alkyl(meth)acrylates, aromatic vinyl monomer and unsaturated carboxylic acid anhydride;

B. 4.0 to 20.0 wt.-%, preferably 6.0 to 10.0 wt.-% of a copolymer comprising aromatic vinyl monomer and a vinyl cyanide monomer; and C. 12.0 to 40.0 wt.-%, preferably 16.0 to 36.0 wt.-% of a particulate core-shell type graft copolymer comprising a butadiene-based core as a rubbery phase and a copolymer comprising alkyl(meth)acrylates and, optionally, aromatic vinyl monomer as a hard phase;

wherein the components A and B form a polymer matrix and the particulate core-shell type graft copolymer C is dispersed in said polymer matrix; and the content of the vinyl cyanide monomer in the particulate core-shell type graft copolymer C is not higher than 5.0 wt.-%, preferably not higher than 2.0 wt.-%, more preferably not higher than 0.5 wt.-%, based on the weight of the core-shell type graft copolymer C.

In a particularly preferred embodiment the graft copolymer C is substantially free of vinyl cyanide monomer.

In one preferred embodiment, said composition is a blend of a MMA, styrene, maleic anhydride copolymer with a styrene-acrylonitrile copolymer and a polybutadiene-based impact modifier. In this embodiment, the polybutadiene impact modifier may be grafted with MMA and styrene.

The resulting polymer composition can be prepared and processed in a relatively simple manner and is particularly suitable for the manufacturing of articles using injection moulding, including articles having a complex geometrical shape.

Hence, in its further aspect, the present invention relates to a process for manufacturing of a moulded article from polymer composition of the present invention comprising a step of injection moulding of said composition.

Yet a further aspect of the present invention relates to a moulded article for medical use comprising the polymer composition of the present invention. Importantly, articles manufactured from said polymer compositions not only have an excellent resistance to alcohols, alcohol water mixtures, oils and fats but also show a number of further advantageous properties:

excellent optical properties, in particular high transparency and colour constancy, and their optical appearance is substantially temperature-independent.

very high heat distortion resistance.

outstanding mechanical properties, in particular high modulus of elasticity and high Vicat softening temperature.

Finally, a further aspect of the present invention is use of polymer composition in a medical device such as a disposable medical diagnostic device, an intravenous and catheter accessory, a blood handling device, a chest drainage unit, a respiratory ventilating device, a medical filter housing, a permanent device housing, a tube, a connector, a fitting, or a cuvette.

DETAILED DESCRIPTION OF THE INVENTION

Figure 1:
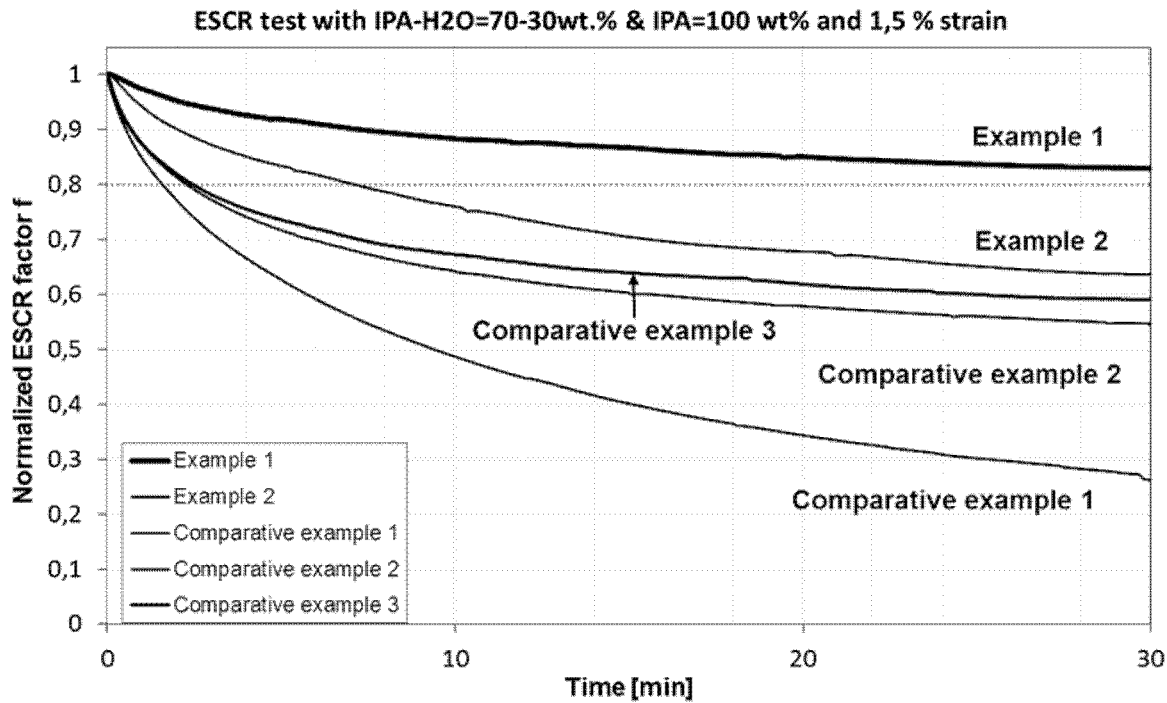
FIG. 1 Results of ECSR tests with isopropanol water and neat isopropanol as a testing medium FIG. 2 Results of ECSR tests with Intralipid® as a testing medium

The polymer composition of the present invention comprises a copolymer comprising:

alkyl(meth)acrylates, aromatic vinyl monomer and unsaturated carboxylic acid anhydride (component A), a copolymer comprising aromatic vinyl monomer and a vinyl cyanide monomer (component B) and a particulate core-shell type graft copolymer (component C), wherein the components A and B form a polymer matrix and the particulate core-shell type graft copolymer C is dispersed in said polymer matrix.

The components A, B and C will be described in the following in a greater detail:

Acrylic-Based Copolymer A

The polymer composition of the present invention comprises 40.0 to 84.0 wt.-%, preferably 54.0 to 78.0 wt.-% of a copolymer comprising alkyl(meth)acrylates, aromatic vinyl monomer and unsaturated carboxylic acid anhydride.

The term "alkyl(meth)acrylates" as used herein may stand for a single alkyl(meth)acrylate or as a mixture of different alkyl(meth)acrylates. The term "(meth)acrylate" as used herein refers not only to methacrylates, e.g. methyl methacrylate, ethyl methacrylate, etc., but also acrylates, e.g. methyl acrylate, ethyl acrylate, etc. and also to mixtures thereof.

For the purposes of the present invention, particular preference is given to $C_1$-$C_{18}$-alkyl (meth)acrylates, advantageously $C_1$-$C_{10}$-alkyl (meth)acrylates, in particular $C_1$-$C_4$-alkyl (meth)acrylates. Preferred alkyl methacrylates encompass methyl methacrylate (MMA), ethyl methacrylate, propyl methacrylate, isopropyl methacrylate, n-butyl methacrylate, isobutyl methacrylate, tert-butyl methacrylate, pentyl methacrylate, hexyl methacrylate, heptyl methacrylate, octyl methacrylate, isooctyl methacrylate, and ethylhexyl methacrylate, nonyl methacrylate, decyl methacrylate, and also cycloalkyl methacrylates, for example cyclohexyl methacrylate, isobornyl methacrylate or ethylcyclohexyl methacrylate. Use of methyl methacrylate is particularly preferred. Preferred alkylacrylates encompass methyl acrylate, ethyl acrylate, propyl acrylate, isopropyl acrylate, n-butyl acrylate, isobutyl acrylate, tert-butyl acrylate, pentyl acrylate, hexyl acrylate, heptyl acrylate, octyl acrylate, isooctyl acrylate, nonyl acrylate, decyl acrylate, and ethylhexyl acrylate, and also cycloalkyl acrylates, for example cyclohexyl acrylate, isobornyl acrylate or ethylcyclohexyl acrylate.

In a particularly preferred embodiment the alkyl(meth)acrylates comprise 80.0 to 100.0 wt.-%, preferably 90.0 to 100.0 wt.-%, more preferably 95.0 to 100.0 wt.-% MMA, and 0.0 to 20.0 wt.-%, preferably 0.0 to 10.0 wt.-%, more preferably 0.0 to 5.0 wt.-% of an alkyl(meth)acrylate other than MMA, based on the weight of the alkyl(meth)acrylates. The alkyl(meth)acrylate other than MMA can be selected from substantially any of the preferred alkylmethacrylates and alkylacrylates listed above. For instance, the alkyl(meth)acrylates may consist of MMA and ethyl acrylate or of MMA and butylacrylate or MMA and butylmethacrylate. In yet a further preferred embodiment, the alkyl(meth)acrylates solely consist of MMA.

Examples of suitable aromatic vinyl compounds include styrene; mono- or polyalkylstyrenes such as o-methylstyrene, m-methylstyrene, p-methylstyrene, o,p-dimethylstyrene, o-ethylstyrene, m-ethylstyrene and p-ethylstyrene; styrene derivatives containing functional groups such as methoxystyrene, ethoxystyrene, vinylbenzoic acid, methyl vinylbenzoate, vinylbenzyl acetate, hydroxystyrene, o-chlorostyrene, p-chlorostyrene and divinylbenzene; 3-phenylpropylene, 4-phenylbutene and α-methylstyrene. Among these, styrene is mostly preferred.

The choice of the unsaturated carboxylic acid anhydrides in the copolymer A is not particularly limited. Said carboxylic acid anhydrides may be advantageously selected from acrylic anhydride, methacrylic anhydride, maleic anhydride, 1,2-cyclohexanedicarboxylic anhydride, itaconic anhydride, wherein maleic anhydride is particularly preferred.

The inventors further found that the composition of the present invention has particularly advantageous environmental chemical stress resistance and optical properties if the copolymer A is a copolymer of
48.0 wt.-% to 90.0 wt.-%, preferably 63.0 wt.-% to 81.0 wt.-% of alkyl(meth)acrylates; 8.0 wt.-% to 35.0 wt.-%, preferably 12.0 wt.-% to 22.0 wt.-% of aromatic vinyl monomer; and 2.0 wt.-% to 17.0 wt.-%, preferably 7.0 wt.-% to 15.0 wt.-% of unsaturated carboxylic acid anhydride, based on the weight of the copolymer A.

A suitable copolymer A may comprise, for example:
50.0 wt.-% to 90.0 wt.-%, preferably 70.0 wt.-% to 80.0 wt.-%, of alkyl(meth)acrylates; 10.0 wt.-% to 20.0 wt.-%, preferably 12.0 wt.-% to 18.0 wt.-%, of styrene; and 5.0 wt.-% to 15.0 wt.-%, preferably 8.0 wt.-% to 12.0 wt.-%, of maleic anhydride, based on the weight of the copolymer A.

In a particularly preferred embodiment of the present invention, the (meth)acrylate based (co)polymer A is a copolymer of MMA, styrene and maleic anhydride. Hence, such copolymer A may comprise, for example:
50.0 wt.-% to 90.0 wt.-%, preferably 70.0 wt.-% to 80.0 wt.-%, of MMA, 10.0 wt.-% to 20.0 wt.-%, preferably 12.0 wt.-% to 18.0 wt.-%, of styrene and 5.0 wt.-% to 15.0 wt.-%, preferably 8.0 wt.-% to 12.0 wt.-%, of maleic anhydride, based on the weight of the copolymer A.

For the sake of achieving optimal rheological properties of the polymer composition the mass average molecular weight Mw of the copolymer A is preferably adjusted to be 80 000 to 240 000 g/mol, more preferably from 120 000 to 200 000 g/mol. Determination of Mw can be advantageously performed by means of gel permeation chromatography (GPC), for instance using PMMA as a calibration standard and tetrahydrofuran (THF) with 0.2 vol.-% trifluoracetic acid (TFA) as an eluent. As an alternative to using a calibration standard a scattering detector may also be employed (cf. H. F. Mark et al., Encyclopaedia of Polymer Science and Engineering, 2nd. Edition, Vol. 10, page 1 et seq., J. Wiley, 1989). Appropriate GPC columns can be readily selected by a skilled person. Such columns are, for instance, commercially available from the company PSS Standards Service GmbH (Mainz, Germany) as columns of the PSS SDV series. As will be readily appreciated by a skilled person, a combination of several GPC columns may also be employed.

Processes suitable for preparation of the copolymer A are per se well-known in the prior art. For example, DE 12 31 013 B discloses a process for preparation of copolymers through bulk polymerisation from 1 to 50 wt.-% of alkylstyrene and 99 to 50 wt.-% of alkylmethacrylate, together with lower amounts of maleic acid anhydride and/or methacrylic acid.

U.S. Pat. No. 3,336,267 A describes a process for preparing copolymers comprising 5 to 95 mol.-% of vinyl aromatic substance, 5 to 40 mol.-% of an unsaturated, cyclic anhydride as well as 0 to 90 mol.-% of an alkyl(meth)acrylate. Here, a mixture of the above monomers is continuously polymerised together with an inert solvent, and the polymer is continuously removed from the polymerisation mixture.

EP 264590 A discloses a process for preparing a moulding compound from a monomer mixture comprising methylmethacrylate, vinyl aromatic substance, maleic anhydride and, optionally, a lower alkylacrylate, in the presence of a non-polymerisable organic solvent, and within a temperature range of 75 to 150° C.

Copolymer B Comprising an Aromatic Vinyl Monomer and a Vinyl Cyanide Monomer

In addition to the acrylic-based copolymer A described above, the polymer composition of the present invention further comprises 4.0 wt.-% to 20.0 wt.-%, preferably 6.0 wt.-% to 10.0 wt.-% of a copolymer comprising an aromatic vinyl monomer and a vinyl cyanide monomer (copolymer B).

Typically, the aromatic vinyl monomer in the copolymer B is the same as one of the aromatic vinyl monomer in the copolymer A. Vinylaromatic monomers which are particularly suitable for use in the copolymer B are styrene, α-methylstyrene, tert.-butylstyrene, monochlorostyrene and vinyltoluene, styrene and α-methylstyrene being particularly preferred. Aromatic vinyl monomers may be used alone or as a mixture thereof.

Examples of appropriate vinyl cyanide monomers for use in the present invention may include without limitation acrylonitrile, methacrylonitrile, ethacrylonitrile, phenylacrylonitrile, α-chloroacrylonitrile, fumaronitrile, and the like. These may be used alone or as a mixture thereof. For example, the vinyl cyanide monomer may include acrylonitrile and/or methacrylonitrile. In a particularly preferred embodiment, the vinyl cyanide monomer is acrylonitrile.

The inventors surprisingly found that haze of the polymer composition of the present invention is particularly low and the polymer composition is particularly transparent and aesthetically appealing, when the copolymer B is a copolymer of
55.0 wt.-% to 90.0 wt.-%, preferably 65.0 wt.-% to 90.0 wt.-%, more preferably 68.0 wt.-% to 85.0 wt.-%, even more preferably 72.0 wt.-% to 80.0 wt.-% of the aromatic vinyl monomer; and
10.0 wt.-% to 45.0 wt.-%, preferably 10.0 wt.-% to 35.0 wt.-%, more preferably 15.0 wt.-% to 32.0 wt.-%, even more preferably 20.0 wt.-% to 28.0 wt.-% of the vinyl cyanide monomer, based on the weight of the copolymer B.

In a particularly preferred embodiment of the present invention
  the aromatic vinyl monomer is styrene;
  the vinyl cyanide monomer is acrylonitrile;
  the unsaturated carboxylic acid anhydride is maleic anhydride; and
  the alkyl(meth)acrylates comprise
    80.0 wt.-% to 100.0 wt.-%, preferably 90.0 wt.-% to 100.0 wt.-%, more preferably 95.0 wt.-% to 100.0 wt.-% methyl methacrylate, and
    0.0 wt.-% to 20.0 wt.-%, preferably 0.0 wt.-% to 10.0 wt.-%, more preferably 0.0 wt.-% to 5.0 wt.-% of an alkyl(meth)acrylate other than methyl methacrylate,
    based on the weight of the alkyl(meth)acrylates.

The corresponding copolymers are commonly known as styrene-acrylonitrile (SAN) resins and are commercially available from various manufacturers such as INEOS Styrolution Group GmbH (Frankfurt, Germany) or Trinseo S.A. (Luxembourg).

Although copolymer B of substantially any molecular weight may be employed, use of copolymer B having a weight average molecular weight Mw of 60 000 g/mol to 300 000 g/mol, preferably of 100 000 g/mol to 250 000 g/mol has proved to be particularly advantageous in terms of mechanical properties of the composition. The average molecular weight Mw of the copolymer B can be determined by GPC with PMMA standards as described above.

Preparation of the copolymer B can be carried out by substantially any known polymerisation method described for preparation of SAN resins, such as mass, solution, emulsion or bead polymerisation.

Particulate Core-Shell Type Graft Copolymer

In addition to the copolymers A and B described above the polymer composition of the present invention further comprises 12.0 wt.-% to 40.0 wt.-%, preferably 16.0 wt.-% to 36.0 wt.-% of a particulate core-shell type graft copolymer C. The particulate core-shell type graft copolymer comprises a butadiene-based core as a rubbery phase and a copolymer comprising alkyl(meth)acrylates and, optionally, aromatic vinyl monomer as a hard phase. Furthermore, in some embodiments, the particulate core-shell type graft copolymer may comprise a butadiene-based core as a rubbery phase and a copolymer comprising alkyl(meth)acrylates, optionally, aromatic vinyl monomer, and, optionally, vinyl cyanide monomer as a hard phase.

According to the present invention, the particulate core-shell type graft copolymer C is dispersed in the polymer matrix which is formed by the copolymers A and B.

In some embodiments, the graft copolymer may be uniformly dispersed in the polymer matrix in form of non-aggregating singular particles. In other embodiments, however, the particulate graft copolymer may form aggregates, wherein said aggregates are uniformly dispersed in the polymer matrix.

It further showed to be advantageous that the content of the vinyl cyanide monomer, as defined above, in the particulate core-shell type graft copolymer C is not higher than 5.0 wt.-%, preferably not higher than 2.0 wt.-%, more preferably not higher than 0.5 wt.-%, based on the weight of the core-shell type graft copolymer C. "Particulate" in this context means crosslinked graft copolymers which may have a core-shell or a core-shell-shell structure.

The terms "alkyl(meth)acrylates" and "aromatic vinyl monomer" as used in the context of the graft copolymer C have the same meaning as described above in the context of copolymers A and B.

Graft copolymers used in the present invention per se are well known and may have different chemical compositions. Preferred graft copolymers are polymer particles which can have a two-layer core-shell structure and are obtained by emulsion polymerization (see, for example, EP 0 113 924 A2, EP 0 522 351 A1, EP 0 465 049 A2 and EP 0 683 028 A1. Use of graft copolymers having a weight average particle diameter from 40 to 1000 nm, preferably from 50 to 500 nm provides an advantageous combination of excellent optical properties and high impact resistance. Average particle diameter can be determined by a method known to a skilled person, e.g. by photon correlation spectroscopy according to the norm DIN ISO 13321 (2017) in water at room temperature (23° C.). For instance, an instrument obtainable from Beckman Coulter under the trade name N5 Submicron Particle Size Analyzer can be used for this purpose.

The exact composition of the graft copolymer C is not particularly limited as long as it comprises a butadiene-based core as a rubbery phase and a copolymer comprising alkyl(meth)acrylates and an aromatic vinyl monomer as a hard phase. Nevertheless, a particularly high resistance to isopropanol-water mixtures and stress crack resistance was observed upon using a particulate core-shell type graft copolymer C comprising:

a butadiene-based core comprising at least 65.0 wt.-%, preferably at least 75.0 wt.-%, more preferably at least 80.0 wt.-% polybutadiene, based on the weight of the butadiene-based core; and a shell comprising 60.0 wt.-% to 100.0 wt.-%, preferably 65.0 wt.-% to 100.0 wt.-%, more preferably 70.0 wt.-% to 100.0 wt.-% of the alkyl(meth)acrylates; and 0.0 wt.-% to 40.0 wt.-%, preferably 0.0 wt.-% to 35.0 wt.-%, more preferably 0.0 wt.-% to 30.0 wt.-% of the aromatic vinyl monomer, based on the weight of the shell.

In one preferred embodiment of the present invention, the particulate core-shell type graft copolymer C is a polybutadiene grafted with from about 17 to 22 weight parts of MMA, from about 4 to 7 weight parts of styrene and 0 to 3 weight parts of ethylacrylate, wherein the weight ratio of polybutadiene to the monomers ranges from about 1:1 to about 4:1, respectively. Such graft copolymers are described e.g. in U.S. Pat. No. 4,085,166 A. The corresponding materials can be prepared by substantially any known polymerisation process such as by free radical polymerisation utilizing initiators and molecular weight regulators commonly used in the prior art. The weight ratio polybutadiene to monomers should be within the above range and the polybutadiene must be present in the final composition in the concentration disclosed.

Optional Additives, Auxiliaries and/or Fillers

The composition of the present invention may optionally also contain customary additives, auxiliaries and/or fillers, such as, for example, heat stabilisers, UV stabilisers, UV absorbers, gamma ray stabilizers, antioxidants, in particular soluble or insoluble dyes or colourants, provided that the properties of the composition according to the invention are not adversely affected by these additives.

Suitable UV absorbers may be, for example, derivatives of benzophenone, the substituents of which, such as hydroxyl and/or alkoxy groups, are generally present in the 2- and/or 4-position. These include 2-hydroxy-4-n-octyloxybenzophenone, 2,4-dihydroxybenzophenone, 2,2'-dihydroxy-4-methoxybenzophenone, 2,2',4,4'-tetrahydroxybenzophenone, 2,2'-dihydroxy-4,4'-dimethoxybenzophenone, 2-hydroxy-4-methoxybenzophenone.

Particularly suitable UV absorbers include inter alia benzotriazoles of the general formula (III)

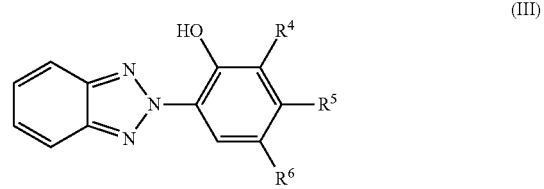

(III)

in which $R^4$, $R^5$ and $R^6$ have the meaning of $R^1$.

Examples of compounds (Ill) which are particularly suitable for use in the present invention are 2-(2'-hydroxy-5'-methyl-phenyl)benzotriazole (commercially available by the name Tinuvin® P, commercially available from BASF SE; Ludwigshafen, Germany) or 2-(2'-hydroxy-3'-dodecyl-5'-methyl-decyl)benzotriazole.

Particularly preferred UV absorbers further include the following hydroxyphenylbenztriazole derivatives:

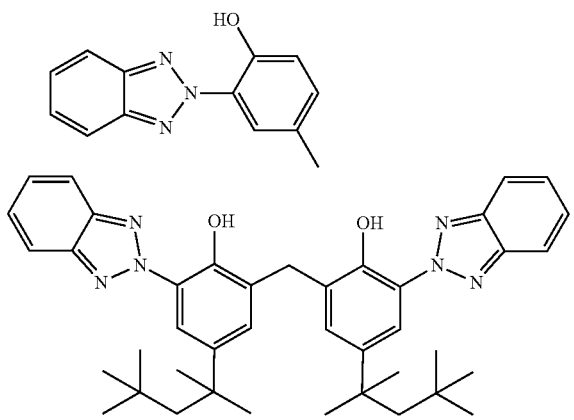

Furthermore, substituted benzotriazoles which are appropriate for use as an added UV absorbers include in particular
2-(2-hydroxy-5-methylphenyl)benzotriazole,
2-[2-hydroxy-3,5-di(alpha,alpha-dimethylbenzyl)phenyl] benzotriazole,
2-(2-hydroxy-3,5-di-tert.-butylphenyl)benzotriazole,
2-(2-hydroxy-3,5-di-tert.-amylphenyl)benzotriazole,
2-(2-hydroxy-5-tert.-butylphenyl)benzotriazole,
2-(2-hydroxy-3-sec-butyl-5-tert.-butylphenyl)benzotriazole and
2-(2-hydroxy-5-tert.-octylphenyl)benzotriazole.

UV absorbers which may equally be used are ethyl-2-cyano-3,3-diphenylacrylate, 2-ethoxy-2'-ethyloxalic acid bisanilide, 2-ethoxy-5-tert.-butyl-2'-ethyloxalic acid bisanilide and substituted phenyl benzoates.

The UV absorbers may be present in the polymer composition as low molecular weight compounds. However, UV-absorbing groups in the matrix polymer molecules may also be covalently bonded after copolymerisation with polymerisable UV-absorbing compounds, such as, for example, acrylic, methacrylic or allyl derivatives of benzophenone derivatives or benzotriazole derivatives.

As will be readily appreciated by a skilled person, mixtures of chemically different UV absorbers may also be employed.

The total content of the UV absorbers in the polymer composition typically ranges from 0.01 wt.-% to 1.0 wt.-%, especially from 0.01 wt.-% to 0.5 wt.-%, in particular from 0.02 wt.-% to 0.2 wt.-%, based on the total weight of the polymer composition of the present invention.

Examples of suitable free radical scavengers/UV stabilisers include inter alia sterically hindered amines, which are known by the name HALS ((Hindered Amine Light Stabiliser). They can be used for inhibiting ageing processes in finishes and plastics, especially in polyolefin plastics (Kunststoffe [Plastics], 74 (1984) 10, pages 620 to 623; Farbe+Lack [Paints+Finishes], 96th year, 9/1990, pages 689 to 693). The tetramethylpiperidine group present in the HALS compounds is responsible for the stabilising effect thereof. This class of compounds may be either unsubstituted or substituted by alkyl or acyl groups on the piperidine nitrogen. The sterically hindered amines do not absorb in the UV range. They trap free radicals formed, which once again the UV absorbers are incapable of doing.

Examples of HALS compounds which have a stabilising effect and can also be used as mixtures are:
bis(2,2,6,6-tetramethyl-4-piperidyl) sebacate,
8-acetyl-3-dodecyl-7,7,9,9-tetramethyl-1,3-8-triazaspiro (4,5)decane-2,5-dione,
bis(2,2,6,6-tetramethyl-4-piperidyl)succinate,
poly(N-ß-hydroxyethyl-2,2,6,6-tetramethyl-4-hydroxypiperidine succinic acid ester) and
bis(N-methyl-2,2,6,6-tetramethyl-4-piperidyl) sebacate.

The free radical scavengers/UV stabilisers are used in the compositions according to the invention in amounts of 0.01 wt.-% to 1.5 wt.-%, especially in amounts of 0.02 wt.-% to 1.0 wt.-%, in particular in amounts of 0.02 wt.-% to 0.5 wt.-%, based on the totality of all constituents.

Lubricants and mould release agents which can reduce or completely prevent possible adhesion of the moulding material to the injection mould are important for the injection moulding process and may also be employed.

For example, lubricants, selected from the group consisting of saturated fatty acids having less than $C_{20}$, preferably $C_{16}$ to $C_{18}$, carbon atoms or of the saturated fatty alcohols having less than $C_{20}$, preferably $C_{16}$ to $C_{18}$, carbon atoms, may be present as auxiliaries. For example, stearic acid, stearyl alcohol, palmitic acid, palmitic alcohol, lauric acid, lactic acid, glycerol monostearate, pentaerythrol, and industrial mixtures of stearic and palmitic acid. Also suitable are n-hexadecanol, n-octadecanol and industrial mixtures of n-hexadecanol and n-octadecanol. A particularly preferred lubricant or mould release agent is stearyl alcohol.

The lubricants are typically used in amounts of not more than 0.35 wt.-%, e.g. 0.05 wt.-% to 0.25 wt.-% based on the weight of the polymer composition.

Furthermore, craze resistance and chemical resistance of the moulding composition can be additionally improved if the composition comprises at least one plasticiser. Plasticisers per se are familiar to the skilled person and described e.g. in Ullmann's Encyclopaedia of Industrial Chemistry, 2012, Plasticisers, D. F. Cadogan etc. For the purpose of the present invention, the plasticisers usually have a molecular weight of from 100 g/mol to 200 000 g/mol and a melting temperature of not more than 40° C. If a polymeric compound is used as a plasticiser in the moulding composition of the present invention, such polymeric compound should ideally have a glass transition temperature Tg of not more than 40° C., as measured according to standard ISO 11357-2:2013. Furthermore, to ensure that presence of the plasticisers does not adversely affect optical properties of the polymeric composition, the plasticiser should be miscible with the moulding composition.

Examples of particularly suitable plasticisers include in particular polyethylene glycol having a molecular weight from 500 to 15 000 g/mol, tributyl citrate and 1,2-cyclohexane dicarboxylic acid diisononyl ester (commercially available as a mixture of isomers under the trademark name Hexamoll® DINCH from BASF SE, Ludwigshafen, Germany). 1,2-cyclohexane dicarboxylic acid diisononyl ester is typically a mixture of isomers and usually comprises 10 wt.-% n-nonylalcohol, 35-40 wt.-% methyloctylalcohol, 40-45 wt.-% dimethylheptylalcohol and 5-10 wt.-% methylethylhexylalkohol, based on the total weight of isononyl alcohol residues.

The plasticisers are typically used in amounts of 0.01 wt.-% to 5.0 wt.-%, preferably 0.05 wt.-% to 3.0 wt.-%, based on the weight of the polymer composition.

In the context of the present invention, addition of the components $c_1$), $c_2$), $c_3$) and/or $c_4$) as described below has also proved particularly useful.

The component $c_1$) designates triaryl phosphites of the general formula (I)

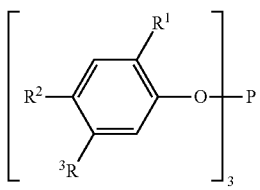

in which $R^1$ and $R^2$ represent $C_1$-$C_{12}$-alkyl, such as methyl, ethyl, propyl, 1-methylethyl, n-butyl, 1-methylpropyl, 2-methylpropyl, 1,1-dimethylethyl, n-pentyl, 1-methylbutyl, 2-methylbutyl, 3-methylbutyl, 1,2-dimethylpropyl, 1,1-dimethylpropyl, 2,2-dimethylpropyl, 1-ethylpropyl, n-hexyl, 1-methylpentyl, 2-methylpentyl, 3-methylpentyl, 4-methylpentyl, 1,2-dimethylbutyl, 1,3-dimethylbutyl, 2,3-dimethylbutyl, 1,1-dimethylbutyl, 2,2-dimethylbutyl, 3,3-dimethylbutyl, 1,1,2-trimethylpropyl, 1,2,2-trimethylpropyl, 1-ethylbutyl, 2-ethylbutyl, 1-ethyl-2-methylpropyl, n-heptyl, 1-methylhexyl, 2-methylhexyl, 3-methylhexyl, 4-methylhexyl, 5-methylhexyl, 1-ethylpentyl, 2-ethylpentyl, 1-propylbutyl, octyl, nonyl, decyl, undecyl and dodecyl, preferably $C_3$-$C_{12}$-alkyl radicals branched in 1-position (α), in particular $C_3$-$C_7$-alkyl radicals, such as 1-methylethyl, 1-methylpropyl, 1,1-dimethylethyl, 1-methylbutyl, 1,2-dimethylpropyl, 1,1-dimethylpropyl, 1-ethylpropyl, 1-methylpentyl, 1,2-dimethylbutyl, 1,3-dimethylbutyl, 1,1-dimethylbutyl, 1,1,2-trimethylpropyl, 1,2,2-trimethylpropyl, 1-ethylbutyl, 1-ethyl-2-methylpropyl, 1-methylhexyl, 1-ethylpentyl and 1-propylbutyl and 1,1,3,3-tetramethylbutyl, 1,1,2,2,5,5-hexamethylhexyl,
$C_5$-$C_8$-cycloalkyl, such as cyclopentyl, cyclohexyl, cycloheptyl and cyclooctyl, preferably cyclohexyl,
$C_6$-$C_{10}$-aryl and $C_6$-$C_{10}$-aryl-$C_1$-$C_4$-alkyl, the aryl radicals of which may be up to trisubstituted by $C_1$-$C_4$-alkyl, such as phenyl, naphthyl or 2,2-dimethylbenzyl, and $R^3$ denotes hydrogen and $C_1$-$C_4$-alkyl, such as methyl, ethyl, n-propyl, isopropyl, n-butyl, isobutyl, sec-butyl and tert.-butyl, preferably hydrogen and methyl.

Examples of compounds (I) which are particularly important with regard to the present invention are the commercially available tris(2,4-di-tert.-butylphenyl) phosphite (IRGAFOS® 168, commercially available from BASF SE, Ludwigshafen, Germany) and tris(nonylphenyl) phosphite, preferably tris(2,4-di-tert.-butylphenyl) phosphite.

The component $c_2$) designates a phenol of the general formula (IV)

$$AB_k \quad (IV)$$

in which k denotes 1, 2 or 4 and, if k is 1, A represents —COOR⁷, —CONHR⁷

$R^7$ denoting $C_1$-$C_{21}$-alkyl and,
if k is 2, A representing —CONH—$(CH_2)_n$—CONH—,

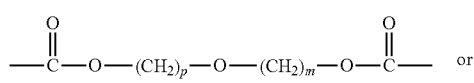 or

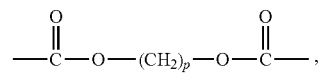

in which p and m denote integers from 1 to 10 and, if k is 4, A represents

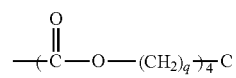

in which q denotes an integer from 1 to 4, and
B represents

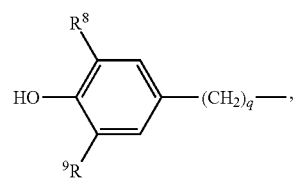

in which $R^8$ and $R^9$ represent hydrogen, methyl or tert.-butyl.

The addition of the component $c_3$) may lead to a further improvement of the stress cracking resistance.

Examples of compounds $c_3$), which are particularly important with regard to the present invention, are octadecyl 3-(3,5-di-tert-butyl-4-hydroxyphenyl)propionate (commercially available as Irganox® 1076 from BASF SE; Ludwigshafen, Germany) and

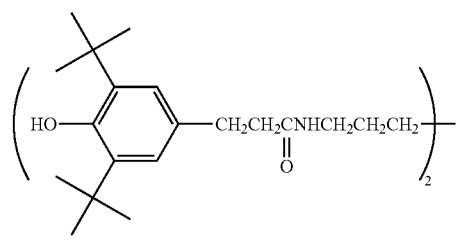

IRGANOX® 1098

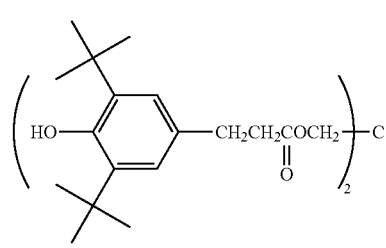

IRGANOX® 1010

-continued

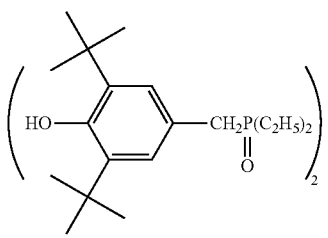

IRGANOX® 1222

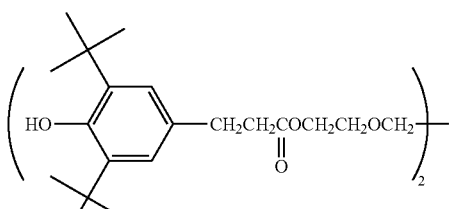

IRGANOX® 245

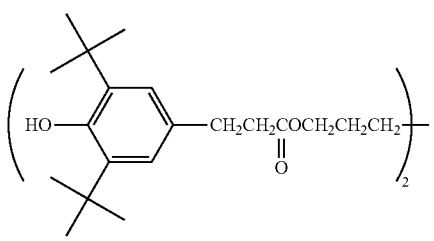

IRGANOX® 259

Furthermore, use of the following stabilisers as compounds $c_4$) showed to be particularly advantageous:

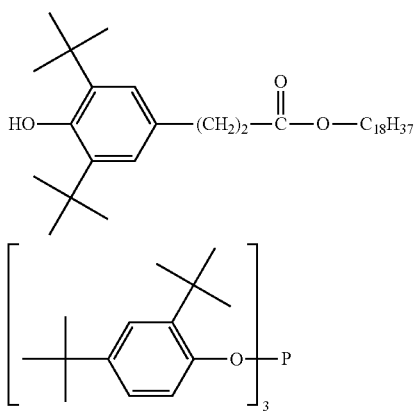

Also thioethers or organic sulfides such as di-tert.-dodecyldisulfide can be advantageously employed for this purpose.

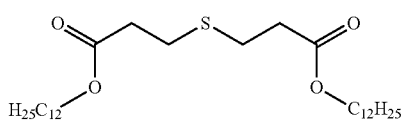

The components $c_1$), $c_2$), $c_3$) and $c_4$) are preferably used as a mixture in order to achieve a synergistic effect with regard to the improvement of the stress cracking resistance after weathering.

The preferred amount of the components $c_1$) to $c_3$) are in each case in the range from 0.01 wt.-% to 1.0 wt.-%, preferably from 0.01 wt.-% to 0.1 wt.-%, based on the total weight of the copolymer components A, B and C. Preferred amount of the component $c_4$) is typically in the range from 0.01 wt.-% to 2.0 wt.-%, preferably from 0.05 wt.-% to 1.0 wt.-%, based on the total weight of the copolymer components A, B and C.

Properties of the Polymer Composition

As already mentioned above, the polymer composition of the present invention has an excellent stress crack resistance in the presence of common disinfectants, oils and fats. Typically, the polymer composition has a normalised ESCR factor f of at least 0.4, preferably of at least 0.5 after a 30 min exposure at 23° C. and 1.5% strain, measured using isopropanol water mixture (70.0 wt.-% isopropanol, 30.0 wt.-% water) according to the method described below.

Additionally, the polymer composition of the present invention has an excellent transparency and a substantially non-cloudy appealing appearance. In particular, haze of the polymeric composition measured at 23° C. on an injection moulded specimen having a thickness of 3 mm according to standard ASTM D1003 (2013) is lower than 30%, preferably lower than 20%, more preferably lower than 15%.

Furthermore, the polymer composition retains its excellent transparency even in the presence of common disinfectants, oils and fats and has a particularly low increase of haze under these conditions. Typically, exposure of a specimen having a thickness of 3 mm to isopropanol water mixture (70.0 wt.-% isopropanol, 30.0 wt.-% water) for 96 h at 23° C. results in an increase of haze of not more than 20%, preferably not more than 15%.

Furthermore, the polymer composition preferably shows a light transmittance, $T_{D65}$ according to DIN 5033-7 (2014) in the range of 40% to 93%, in particular in the range of 70% to 92%, measured at 23° C. on an injection moulded specimen having a thickness of 3 mm.

The yellowness index of the polymer composition, determinable according to DIN 6167 (1980) (illuminant $D_{65}$, 10° on 3 mm layer thickness) should preferably be less than 7, preferably less than 5, measured at 23° C. on an injection moulded specimen having a thickness of 3 mm.

The Vicat softening temperature of the polymer composition according to ISO 306-B50 (2014) is advantageously at least 100° C., preferably at least 105° C., more preferably at least 108° C.

The nominal elongation at break of the polymer composition according to ISO 527 (2012) should preferably be at least 3.0%, particularly preferably 3.2%.

The modulus of elasticity of the polymer composition according to ISO 527 (2012) is advantageously greater than 1500 MPa, preferably greater than 1800 MPa.

Due to its advantageous rheological properties, the polymer composition of the present invention is highly suitable for manufacturing of medical grade articles by means of injection moulding. The composition of the present invention typically has a melt volume flow rate MVR measured according to ISO 1133 (2012) at 230° C. and 5.0 kg, of greater than 0.5 cm³/10 min, preferably of greater than 0.7 cm³/10 min, most preferably in the range from 1.0 cm³/10 min to 6.0 cm³/10 min.

Preparation of the Composition and of the Moulded Articles

The composition of the present invention can be prepared by dry blending the components described above, which may be present as powder, particles or preferably pellets.

The composition of the present invention can also be prepared by mixing the components B and C either at the same time or successively into the melt of polymer A. The composition can also be prepared by melting and mixing the individual components in the molten state or by melting dry premixes of the individual components to give a ready-to-use moulding material. This can be effected, for example, in single-screw or twin-screw extruders. The extrudate obtained can then be granulated. Customary additives, auxiliaries and/or fillers can be directly admixed or added later by end users as required.

The composition according to the invention is suitable as a starting material for the production of moulded articles for medical use having improved resistance to chemicals and stress cracking resistance. The forming of the composition can be effected by methods known per se, for example by processing via the elastoviscous state, i.e. by kneading, rolling, calendering, extrusion or injection moulding, extrusion and injection moulding, in particular injection moulding, being particularly preferred here.

The injection moulding of the composition can be effected in a manner known per se at temperatures in the range of 220° C. 260° C. (melt temperature) and a mould temperature of preferably 60° C. to 90° C.

The extrusion is preferably carried out at a temperature of 220° C. to 260° C.

A further aspect of the present invention relates to a moulded article comprising the polymer composition as described above, in particular for applications where a high chemical resistance and chemical stress cracking resistance is required. In a particularly preferred embodiment, the moulded article is a medical device which is preferably a disposable medical diagnostic device, an intravenous and catheter accessory, a blood handling device, a chest drainage unit, a respiratory ventilating device, a medical filter housing, a permanent device housing, a tube, a connector, a fitting, or a cuvette. Said devices include but are not limited to luer locks, Y-sites, spikes, fittings, nozzles, protection caps and covers, blood plasma separators, collection and specimen vessels, needle hubs and adapters, catheter accessories, chest drainage units, valve assemblies, meter housings, flow controls, filter housings, drip chambers, intravenous adapters, yankauers, rigid tubes, diagnostic cuvettes, diagnostic test packs, diagnostic rotors, optical sensor viewports, microfluidic devices, bracheotherapy needle hubs, inhalation mouthpieces and spacers.

Said moulded articles can also be advantageously used in applications like automotive interior or exterior, where a high chemical resistance, especially lipid resistance, is desired.

The following examples explain the present invention in detail without it being intended to limit the concept of the invention.

EXAMPLES

GPC Measurement Conditions:
Eluent: THF (HPLC-Grade)+0.2 vol.-% TFA
Flow rate: 1 ml/min
Injected volume: 100 μl
Detection: RI HPS
Concentration
sample solution: 2 g/l
Standard: PMMA
Acrylic-Based Copolymer A The copolymer A comprising 75.0 wt.-% MMA, 15.0 wt.-% styrene and 10.0 wt.-% maleic anhydride was prepared according to the procedure described in DE 44 40 219 A1.

The starting materials employed for the preparation were as follows:
74.638 g methyl methacrylate
15.00 g styrene
10,00 g maleic anhydride
0.33 g n-dodecylmercaptane
0.034 g tert.-butyl peroxyneodecanoate
0.01 g tert.-butyl peroxyisononanoate The starting materials were placed into Hostaphan® polyester bags, polymerized in a water bath (12 h at 52° C., followed by 16 h 44° C.) and then tempered in a tempering furnace (6 h at 110° C.). Finally, the resulting copolymer A was ground and degassed using an extruder.

The obtained copolymer A had a molecular weight Mw of 150 000 g/mol, measured using GPC with PMMA as a standard, and had a solution viscosity in chloroform at 25° C. (ISO 1628 part 6) of about 72 ml/g.

Copolymer B

As a copolymer B styrene acrylonitrile copolymer (SAN) comprising 76.0 wt.-% styrene and 24.0 wt.-% acrylonitrile was employed. The corresponding material is commercially obtainable under trademark name Luran® 358 N from INEOS Styrolution Group GmbH (Frankfurt, Germany).

Particulate Core-Shell Type Graft Copolymers C

As copolymer C1 polybutadiene grafted with MMA-styrene (77.0 wt.-% MMA, 23.0 wt.-% styrene) was employed. The weight ratio MMA/styrene shell to polybutadiene core was 1:3. The preparation was carried out as described in Example 1 of U.S. Pat. No. 4,085,166.

75 wt.-% polybutadiene in latex form were mixed with 19.6 wt.-% MMA and 5.4 wt.-% styrene. The monomers MMA and styrene were grafted onto the polybutadiene core by means of a redox initiated polymerization in the presence of 0.07 wt.-% tert-butyl hydroperoxide, 0.6 wt.-% sodium formaldehyde sulfonate, 27 ppm iron chloride hexahydrate and 127 ppm ethylene dimine tetraacetic acid 0.4 Na salt based on the monomers. Polymerisation was carried out at room temperature for 10 hours.

As a copolymer C2 polybutadiene-based impact resistance agent Kane Ace® M-711 (commercially available from Kaneka Corp., Takasago, Japan) was employed. Kane Ace® M-711 is a particulate impact resistance agent obtainable by graft copolymerization of MMA.

Copolymer D (Comparative)

For comparison purposes, a copolymer comprising 74.0 wt.-% MMA, 23.0 wt.-% styrene and 3.0 wt.-% ethylacrylate was employed. The copolymer D had a molecular weight Mw of 205 000 g/mol and a solution viscosity in chloroform at 25° C. (ISO 1628 part 6) of about 83 ml/g. Copolymer D was preparation in the same manner as copolymer A.

Examples

The compositions of Examples 1 and 2 and Comparative Example 1-3 are summarized in Table 1.

The polymeric compositions were prepared from dry blends of the individual components by means of a tumbling mixer and was then compounded on a Leistritz LSM 30/34 twin-screw extruder.

TABLE 1

Compositions of Examples 1 and 2 and Comparative Example 1-3

| Example | Copolymer A | Copolymer B | Copolymer C | Copolymer D |
|---|---|---|---|---|
| Example 1 | 73.5 wt.-% | 9.0 wt.-% | 17.5 wt.-% C1 | |
| Example 2 | 57.9 wt.-% | 7.1 wt.-% | 35.0 wt.-% C2 | |
| Comp. Example 1 | | | 17.5 wt.-% C1 | 82.5 wt.-% |
| Comp. Example 2* | 89.0. wt.-% | 11.0. wt.-% | | |
| Comp. Example 3* | 89.0. wt.-% | 11.0. wt.-% | | |

*Comparative Examples 2 and 3 (identical polymer compositions) illustrate the teaching of WO 2008/148595 A1

Subsequently, test specimens (dimensions: 80 mm×20 mm×d, thickness d=4 mm, 20 mm width and 80 mm length) were prepared by press moulding pellets in a mould at 235° C.

Determination of Crack Formation (ESCR) with Water Isopropanol Mixture

Before the test, all samples were stored for at least 24 h at 23° C./50% relative humidity. The tests were performed at 23° C./50% relative humidity.

In the ESCR test according to Prof. Bledzki (A. Bledzki, C. Barth, Materialprufung [Material Testing] 40, 10 (1998)), an outer fibre strain which was constant as a function of time was applied by means of a three-point bending arrangement. The test specimen (dimensions 80 mm×20 mm×d, thickness d=4 mm) rested flat on two supports with a spacing L of 64 mm.

Figure 2:
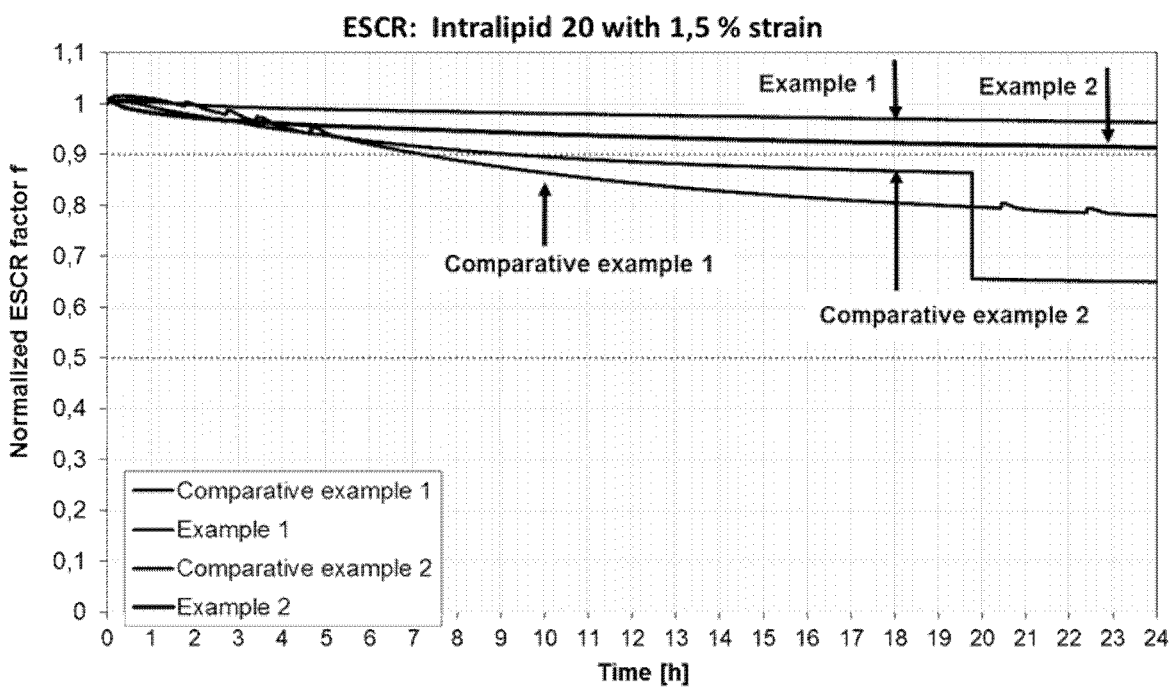

The specific experimental setup is illustrated by FIGS. 1 and 2 of patent application WO 2008/148595 A1. FIG. 1 schematically shows the three-point bending arrangement in the ESCR test. FIG. 2 shows an ESCR test apparatus (HBM S2 100 N, commercially available from Hottinger Baldwin Messtechnik GmbH, Darmstadt, Germany; sensitivity of 2 mV/V, the arrangement from FIG. 1 is upside down here). The cylindrical supports and the crossbeam have a radius of 10 mm.

The necessary sag s at a given outer fibre strain £ (in the middle of the test specimen on the side opposite the crossbeam) was calculated as in ISO 178 (2013) according to:

$$\varepsilon = \frac{6sd}{L^2} \quad (1)$$

The sag s was adjusted by means of a knurled screw. £ was adjusted to a value of 1%. After approaching the outer fibre strain (T$_0$), a hold time of 2 min was allowed in order to await the first relaxation phenomena. At T=T$_1$=2 min, the filter paper already placed on top beforehand in the middle and having the dimensions 50×10 mm$^2$ was wetted with the medium (isopropanol). The force $F_T^{mM}$ which was required for maintaining the outer fibre strain was measured from T$_1$ as a function of time T. The filter paper was kept constantly moist with the medium in the course of the measurement. The measurement was terminated on breaking of the test specimen (force=0) and after 30 min at the latest.

The procedure was carried out with 4 identical test specimens and an average value was calculated. For comparison, the force $F_T^{oM}$ curve was also recorded for a test specimen which was exposed to the same outer fibre strain but no medium. In the case of the samples without influence of the medium, the measured force value decreased slowly whilst the samples which are tested on the influence of the medium showed a faster decrease in force depending on resistance.

The time-dependent measure of the stress cracking resistance $f_t^{norm}$, also known as "normalised ESCR factor", is obtained in this experiment from the ratio of the forces $F_t^{mM}$ required for maintaining the outer fibre strain and $F_t^{oM}$ without influence of the medium:

$$f_t^{norm} = \frac{F_t^{mM} \cdot F_{t1}^{oM}}{F_{t1}^{mM} \cdot F_t^{oM}} \quad (2)$$

Here, the forces are additionally based on their value at t$_1$ so that at time t$_1$:$f_t^{norm}$=1. Three curves are a result in the diagram, for each test specimen with influence of the medium. The reference in each case is the same measurement for the test specimen without the influence of the medium. Normalised ESCR factors close to 1 characterize a good ESC resistance, and sharply decreasing values at $f_t^{norm}$ over time t characterize poor resistance.

The ECSR test duration was 30 min at 1.5% strain, time dependency of the normalised ESCR factors are shown in FIG. 1.

Specimen of Examples 1 and 2 and Comparative Examples 1 and 2 were tested using water isopropanol mixture comprising 70.0 wt.-% isopropanol and 30.0 wt.-% water. Additionally, the specimen of Comparative Example 3 was tested using neat isopropanol.

During the tests specimen of Examples 1 and 2 and of Comparative Example 2 remain transparent whereas the specimen of Comparative Example 1 becomes turbid.

The specimens were prepared by press moulding of the granules in a mould at 230° C.

The obtained test results are shown in Table 2.

TABLE 2

Results of ECSR tests with water isopropanol mixture and neat isopropanol as testing medium after a 30 min exposure

| Example | Test medium | Normalised ESCR factor f |
|---|---|---|
| Example 1 | isopropanol/water | 0.83 |
| Example 2 | isopropanol/water | 0.64 |
| Comp. Example 1 | isopropanol/water | 0.26 |
| Comp. Example 2 | isopropanol/water | 0.54 |
| Comp. Example 3 | isopropanol | 0.59 |

Comparative Examples 2 and 3 used the same polymer composition. Exposition to neat isopropanol in Comparative Example 3 lead to a lower reduction of the standardized ESCR factor than in Comparative Examples 2, where a more corrosive isopropanol/water mixture was used.

The polymer composition of Comparative Example 1 differs from the polymer composition of Example 1 only in that polymer composition of Comparative Example 1 comprises a different polymer matrix material (Copolymer D instead of a combination of Copolymers A and B). As a consequence, the polymer composition of Comparative Example 1 shows only a poor cracking resistance in the ESCR test with water isopropanol mixture.

Determination of Crack Formation (ESCR) with Soy Bean Oil

As a test liquid Intralipid® 20% emulsion (commercially available from Fresenius Kabi Austria GmbH) was employed. Intralipid® 20% is a sterile fat emulsion having a pH of 8 an osmolality of approx. 350 mosmol/kg and comprising 20% soy bean oil, 1.2% egg yolk phospholipids, 2.25% glycerine and water.

Specimen of Examples 1 and 2 and Comparative Examples 1 and 2 were tested. The ECSR test duration was 24 h at 1.5% strain, time dependency of the normalised ESCR factors are shown in FIG. 2.

The obtained test results are summarized in Table 3.

TABLE 3

Results of ECSR tests with Intralipid ® as a testing medium after a 24 h exposure

| Example | Test medium | Normalised ESCR factor f |
|---|---|---|
| Example 1 | Intralipid ® | 0.96 |
| Example 2 | Intralipid ® | 0.91 |
| Comp. Example 1 | Intralipid ® | 0.78 |
| Comp. Example 2 | Intralipid ® | 0.65* |

*in Comparative Example 2 one of four specimens broke during the test after 20 h Immersion Tests with Water Isopropanol Mixture Polymer compositions for medical applications, must retain their mechanical and optical properties upon a long term storage in the presence of a disinfectant solution at 23° C. In particular, formation of haze or cracks should be minimized.

Specimen of Examples 1 and 2 and Comparative Examples 1 and 2 were tested using water isopropanol mixture comprising 70.0 wt.-% isopropanol and 30.0 wt.-% water. Additionally, the specimen of Comparative Example 3 was tested using neat isopropanol. The immersion test duration was 96 hours.

Subsequently a visual evaluation of the specimens took place.

The obtained test results are shown in Table 4.

TABLE 4

Results of immersion tests with water isopropanol mixture and neat isopropanol as a testing medium

| Example | Test medium | Transparency after 96 h |
|---|---|---|
| Example 1 | isopropanol/water | yes |
| Example 2 | isopropanol/water | yes |
| Comp. Example 1 | isopropanol/water | no |
| Comp. Example 2 | isopropanol/water | yes |
| Comp. Example 3 | isopropanol | yes |

Results in Table 4 show that the impact modified polymer compositions of the present invention (Examples 1 and 2) remained highly transparent and without any undesired yellow tint upon a long term storage in the presence of isopropanol/water.

In contrast, the impact modified sample of Comparative Example 1 became entirely non-transparent.

Also not impact modified samples of Comparative Examples 2 and 3 remained transparent during the immersion tests. However, performance of the corresponding polymer composition in ESCR tests was not as good as in inventive Examples 1 and 2.

The invention claimed is:

1. A polymer composition comprising, based on the weight of the polymer composition, the following components A, B and C:
    A. 40.0 to 84.0 wt.-% of a copolymer comprising alkyl (meth)acrylates, aromatic vinyl monomer and unsaturated carboxylic acid anhydride;
    B. 4.0 to 20.0 wt.-%, of a copolymer comprising aromatic vinyl monomer and a vinyl cyanide monomer; and
    C. 12.0 to 40.0 wt.-%, of a particulate core-shell type graft copolymer comprising a butadiene-based core as a rubbery phase and a copolymer comprising alkyl(meth) acrylates and, optionally, aromatic vinyl monomer as a hard phase;
    wherein the components A and B form a polymer matrix and the particulate core-shell type graft copolymer C is dispersed in said polymer matrix; and
    wherein a content of vinyl cyanide monomer in the particulate core-shell type graft copolymer C is from 0 to 5.0 wt.-%, based on the weight of the particulate core-shell type graft copolymer C.

2. The polymer composition according to claim 1, wherein the copolymer A is a copolymer of
    48.0 to 90.0 wt.-% of alkyl(meth)acrylates;
    8.0 to 35.0 wt.-% of aromatic vinyl monomer; and
    2.0 to 17.0 wt.-% of unsaturated carboxylic acid anhydride, based on the weight of the copolymer A.

3. The polymer composition according to claim 1, wherein a weight average molecular weight Mw of the copolymer A is from 80000 to 240000 g/mol.

4. The polymer composition according to claim 1, wherein the copolymer B is a copolymer of
    55.0 to 90.0 wt.-% of the aromatic vinyl monomer; and
    10.0 to 45.0 wt.-%, of the vinyl cyanide monomer, based on the weight of the copolymer B.

5. The polymer composition according to claim 1, wherein
    the aromatic vinyl monomer is styrene;
    the vinyl cyanide monomer is acrylonitrile;
    the unsaturated carboxylic acid anhydride is maleic anhydride; and
    the alkyl(meth)acrylates comprise
    80.0 to 100.0 wt.-% of methyl methacrylate, and
    0.0 to 20.0 wt.-% of an alkyl(meth)acrylate other than methyl methacrylate, based on the weight of the alkyl (meth)acrylates.

6. The polymer composition according to claim 1, wherein the particulate core-shell type graft copolymer C has a weight average particle diameter from 40 to 1000 nm, determined according to DIN ISO 13321 (2017) in water at 23° C.

7. The polymer composition cording to claim 1, wherein the particulate core-shell type graft copolymer C comprises:
    a butadiene-based core comprising at least 65.0 wt.-% of polybutadiene, based on the weight of the butadiene-based core; and
    a shell comprising 60.0 to 100.0 wt.-% of alkyl(meth) acrylates and 0.0 to 40.0 wt.-% of the aromatic vinyl monomer, based on the weight of the shell.

8. The polymer composition according to claim 1, wherein the haze of the composition measured at 23° C. on a 3 mm injection moulded specimen according to standard ASTM D1003 is lower than 30%.

9. The polymer composition according to claim 1, wherein the composition has one or more of the following properties (i)-(iii):
   a Vicat softening temperature according to ISO 306-B50 of at least 100° C.;
   (ii) a nominal elongation at break according to ISO 527 of at least 3.0%; and/or
   (iii) a modulus of elasticity according to ISO 527 of greater than 1500 MPa.

10. The polymer composition according to claim 1, wherein the composition has a melt volume flow rate MVR, measured according to ISO 1133 at 230° C. and 5.0 kg, of greater than 0.5 cm$^3$/10 min.

11. A process for manufacturing of a moulded article, the process comprising:
   injection moulding the polymer composition according to claim 1.

12. A moulded article comprising the polymer composition according to claim 1.

13. A moulded article according to claim 12, wherein the moulded article is a medical device.

14. A method for producing a medical device, comprising:
   injection moulding the polymer composition according to claim 1 into a form of a medical device.

15. The moulded article according to claim 13, wherein the medical device is a disposable medical diagnostic device, an intravenous and catheter accessory, a blood handling device, a chest drainage unit, a respiratory ventilating device, a medical filter housing, a permanent device housing, a tube, a connector, a fitting, or a cuvette.

16. The method according to claim 14, wherein the medical device is a disposable medical diagnostic device, an intravenous and catheter accessory, a blood handling device, a chest drainage unit, a respiratory ventilating device, a medical filter housing, a permanent device housing, a tube, a connector, a fitting, or a cuvette.

17. The polymer composition according to claim 1, comprising 54.0 to 78.0 wt.-% of the component A, based on the weight of the polymer composition.

18. The polymer composition according to claim 1, comprising 6.0 to 10.0 wt.-% of the component B, based on the weight of the polymer composition.

19. The polymer composition according to claim 1, comprising 16.0 to 36.0 wt.-% of the component C, based on the weight of the polymer composition.

20. The polymer composition according to claim 1, wherein a content of vinyl cyanide monomer in the particulate core-shell type graft copolymer C is from 0 to 0.5 wt.-%, based on the weight of the particulate core-shell type graft copolymer C.

* * * * *